United States Patent [19]

Swedberg

[11] 3,973,880
[45] Aug. 10, 1976

[54] DRIVE CONNECTION MEANS FOR A HYDRAULIC DEVICE

[75] Inventor: Nils Einar Swedberg, Chanhassen, Minn.

[73] Assignee: Eaton Corporation, Cleveland, Ohio

[22] Filed: Apr. 18, 1975

[21] Appl. No.: 569,504

Related U.S. Application Data

[62] Division of Ser. No. 387,988, Aug. 13, 1973, Pat. No. 3,899,270.

[52] U.S. Cl. .............................. 418/61 B; 64/9 R
[51] Int. Cl.[2] ...................... F01C 1/02; F03C 3/00; F16D 3/18; F04C 1/02
[58] Field of Search .................... 418/61 B; 64/9 R; 60/384

[56] References Cited
UNITED STATES PATENTS

| | | | |
|---|---|---|---|
| 3,547,563 | 12/1970 | Charlson | 418/61 B |
| 3,572,983 | 3/1971 | McDermott | 418/61 B |

Primary Examiner—John J. Vrablik
Attorney, Agent, or Firm—Teagno & Toddy

[57] ABSTRACT

Axial, positioning means are provided in a hydraulic device of the gerotor type to prevent failure of splined drive connections. The drive connections for the device includes a star member of the gerotor set which partakes of hypocycloidal movement and has a straight splined, central opening extending therethrough, a journalled input-output shaft hollowed at one end with straight splined teeth formed therein, and a universal main drive shaft having crowned spline teeth at its end portions which are in splined, driving engagement with the star member and input-output shaft respectively.

The positioning means includes an abutment preventing movement of the main drive shaft in a first axial direction and biasing means forcing the drive shaft into contact with the abutment and thus preventing movement of the shaft in the opposite axial direction. In one embodiment of the invention the biasing means comprises a spring assembly. In another embodiment of the invention a hydraulic arrangement provides means for biasing the drive shaft.

8 Claims, 5 Drawing Figures

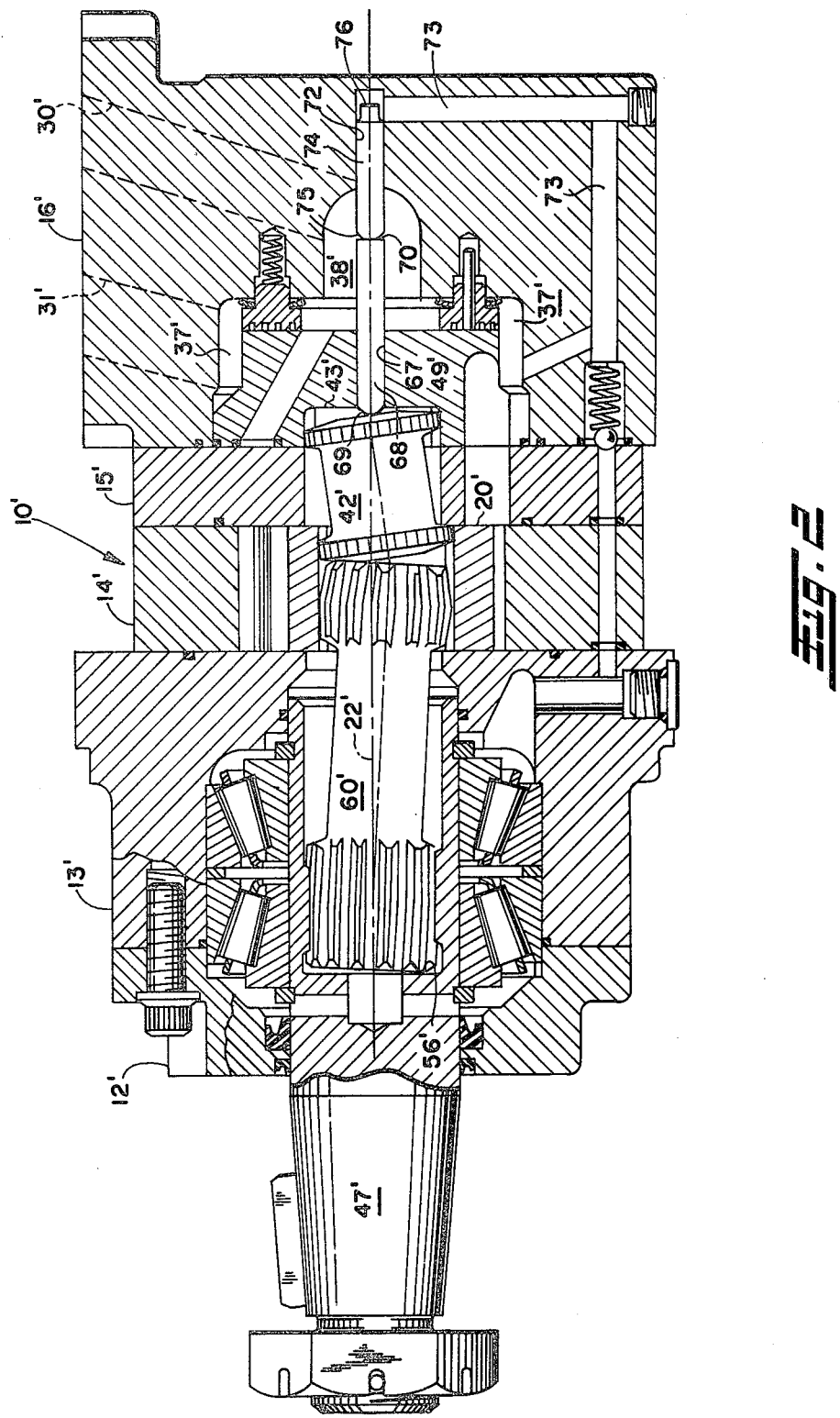

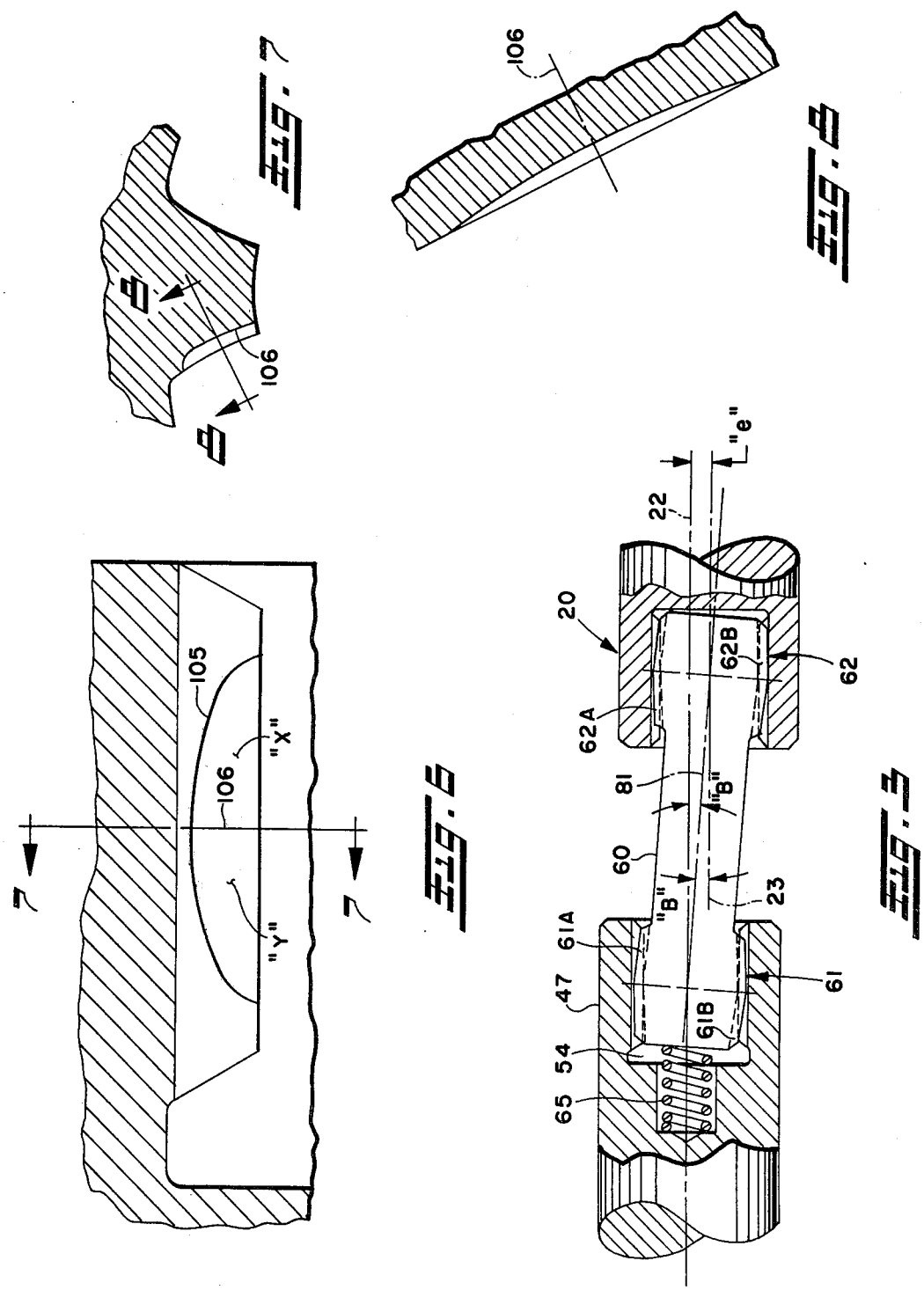

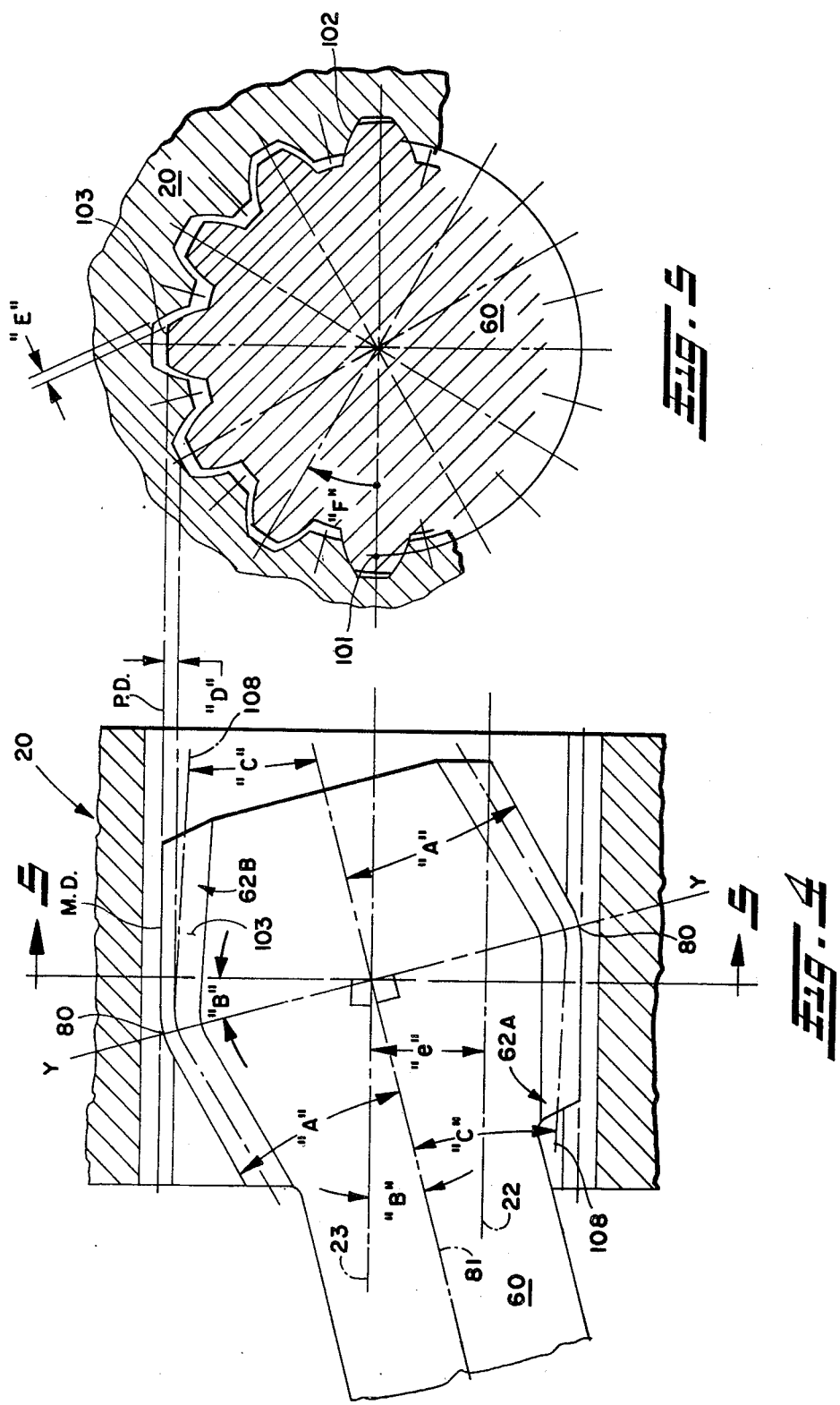

DRIVE CONNECTION MEANS FOR A HYDRAULIC DEVICE

This is a division of application Ser. No. 387,988 filed Aug. 13, 1973 now U.S. Pat. No. 3,899,270.

This invention relates generally to rotary fluid devices and more particularly to an improved drive connection for such devices.

The invention is particularly applicable to hydraulic devices of the gerotor type and will be described with particular reference thereto. However the invention may have broader applications and may be applied to any drive connection which includes a drive shaft having crowned spline teeth at its end portions received in splined engagement with a rotating and orbiting first power member at one end and a rotatable second power member at its other end.

Hydraulic devices particularly applicable to this invention are generally characterized by a gerotor set with associated valving whereby an externally toothed star member eccentrically disposed within an internally toothed ring member rotates and orbits in hypocycloidal motion with respect to the ring member. A splined drive arrangement is commonly used to translate the rotational component of the star member's movement either to (motor) or from (pump) a journalled input-output shaft. The input-output shaft is hollowed at one end with a plurality of spline teeth disposed therein. Similarly the star member has a splined central opening extending therethrough. A main drive shaft, oftentimes referred to as a wobble or a dogbone shaft, has crowned spline teeth at both its end portions which establish splined drive connections with the input-ouput shaft at one end and the star member at the opposite end.

The splined drive connections are under considerable stress because hydraulic devices of the gerotor type are commonly used in high torque motor applications. Failures resulting from load fractures of worn spline teeth have occurred in service even though the splined connections are of high alloyed, case carburized steel. Investigations of failures indicate that the geometry of the drive arrangement tends to develop a "seating" tooth wear pattern when the device is acting as a motor under load. When the device acts as a pump, such as in dynamic braking, torque direction is reversed, and an axial force is developed which shifts the main drive shaft with respect to the input-output shaft and star member whereby a second wear pattern tends to develop. When motor load is reapplied, misalignment of the tooth wear patterns results in tooth interference which causes only a few worn splines to receive a concentrated, point-type loading and fail. Accordingly, premature failure of the drive connections can be alleviated if the main shaft be permanently fixed against axial movement with respect to the input-output shaft and star member to permit development of a "seating" tooth wear pattern whereby all spline teeth are equally loaded.

It is believed that the prior art has failed to realize the reasons for such spline fractures or having realized same has failed to provide suitable positioning means for preventing such failures. Thus, in one instance, the main drive shaft has been fixed with reference to the input-output shaft by a snap ring on the main shaft fitting into a groove which may be formed within the input-output shaft for the purpose of preventing total spline disengagement by axial movement of the main shaft. Such structure is not believed capable of preventing spline fractures because the groove must necessarily be wider than the ring to permit orbital and rotational movement of the universal shaft in angular relationship to the input-output shaft. This clearance is believed sufficient to upset the wear pattern formed in the spline teeth. In another instance, gerotor devices coupled to a controller for use in power steering applications have employed springs to balance or position the spool and sleeve mechanism of the controller. It is known to maintain the springs in compression by utilizing one end of the main drive shaft as a spring seat as shown in U.S. Pat. No. 3,613,364 to Goff, and this necessarily causes the main shaft to be axially positioned. However, spline fractures of main shafts used in such controllers do not occur because the drive shaft is not under significant load. Furthermore it is not believed that the springs employed in such controllers, which were designed for valve positioning, could adequately function to position a main drive shaft in a gerotor motor application where the main drive shaft is under significant torque loading. Finally, it is not possible to manufacture a drive-train arrangement which provides abutments at the drive shaft ends which could axially fix the drive shaft within proper wear limits because of manufacturing tolerances, thermal expansion, etc.

It is thus a principal object of the subject invention to provide in hydraulic devices of the gerotor type, axial, spline positioning means for alleviating drive-train failures thereof.

This object, along with other features of the subject invention, is achieved in a rotary fluid device comprising a known gerotor set and associated known valving means which results in the star member of the gerotor set rotating and orbiting in hypocycloidal motion with respect to the fixed ring member. Drive to or from the star member occurs by a main drive shaft having external, crowned spline teeth at both end portions. One end portion is in splined engagement with internal splines formed in a hollowed end of an axially fixed, rotatable, input-output shaft member. The drive shaft's other end portion is in splined engagement with internal splines formed in a central opening extending through the star member. Axial positioning means are provided for maintaining the main drive shaft in fixed axial relationship with respect to the input-output shaft and star member. The axial positioning means includes abutment means at one end of the universal main drive shaft preventing axial movement of the drive shaft in one direction and biasing means at the other end of the main drive shaft biasing the drive shaft against the abutment means and preventing movement in the opposite axial direction. The biasing means, determined as a function of the torque loading on the input-output shaft and the geometry of the drive arrangement, always assures alignment of the spline tooth wear patterns notwithstanding the motor-pump cyclical loadings on the shaft.

In accordance with another aspect of the invention the abutment means includes a splined valve drive shaft extending from a star member in an opposite direction to that of the main drive shaft. The biasing means includes the input-output shaft having a second bore concentric with the first bore and communicating therewith and a spring disposed in the second bore biasing the main shaft against the valve drive shaft to prevent axial movement of the drive shaft in the opposite direction. The spring is designed to the maximum torque loading of the input-output shaft or alternatively stated, the torque generated by the gerotor set.

In accordance with another aspect of the subject invention the abutment means could comprise either the wall terminating the end of the first bore in the input-output shaft or the valve drive shaft. The positioning means broadly includes plunger means engaging the main drive shaft end opposite the abutment and high pressure passage means to bias the plunger means into engage with the main drive shaft. In this arrangement the biasing force of the positioning means is directly proportional to the torque imposed on the drivetrain arrangement.

In accordance with still another aspect of the subject invention, the plunger means includes a first plunger extending in sliding, sealing engagement through a bore in the valve member to bias the main shaft into abutment with the input-output shaft. A first valve cavity under high pressure in the valving means is provided to bias the first plunger into contact with the main shaft when the star member is rotating in one direction. To permit actuation of the first plunger when the star member is rotating in an opposite direction and for ease of manufacture, a second plunger adapted to be in contact with the first plunger is slidingly sealed in a bore in a housing which communicates with a second flow cavity formed in the valve member. The second flow cavity is adapted to be in communication with one of the interchangeable inlet-outlet ports in the device and the first cavity is adapted to be in communication with the other inlet-outlet port.

It is thus another object of the subject invention to provide means for improving the life of a spline drivetrain arrangement by means of hydraulic positioning means for use in rotary devices of the gerotor type.

It is yet another object of the subject invention to provide axial positioning means for spline teeth connections to improve the life and wear thereof wherein a first internally splined rotatable member is adapted to be drivingly engaged with a second internally splined rotatable and orbital member by means of an externally crowned, splined shaft extending therebetween.

The invention may take physical form in certain parts and arrangement of parts, preferred embodiments of which will be described in detail herein and illustrated in the accompanying drawings which form a part hereof and wherein:

FIG. 2 is a longitudinally sectioned view of a rotary fluid device showing a second embodiment of the axial drive positioning means of the subject invention;

FIG. 3 is a longitudinal view showing the general geometry of the drive-train arrangement of a rotary fluid device or any other mechanical torque transmitting device employing a crowned splined connection;

FIG. 4 is a longitudinal view showing internal and external spline engagement for a portion of the drivetrain;

FIG. 5 is a projected cross sectional view showing spline teeth engagement taken along Line 5—5 of FIG. 4;

FIG. 6 is a view showing a developed wear pattern on the flank of a spline tooth;

FIG. 7 is a view of the spline tooth wear pattern taken along Line 7—7 of FIG. 6; and FIG. 8 is a section view of the wear pattern taken along Line 8—8 of FIG. 7.

Figure 1:
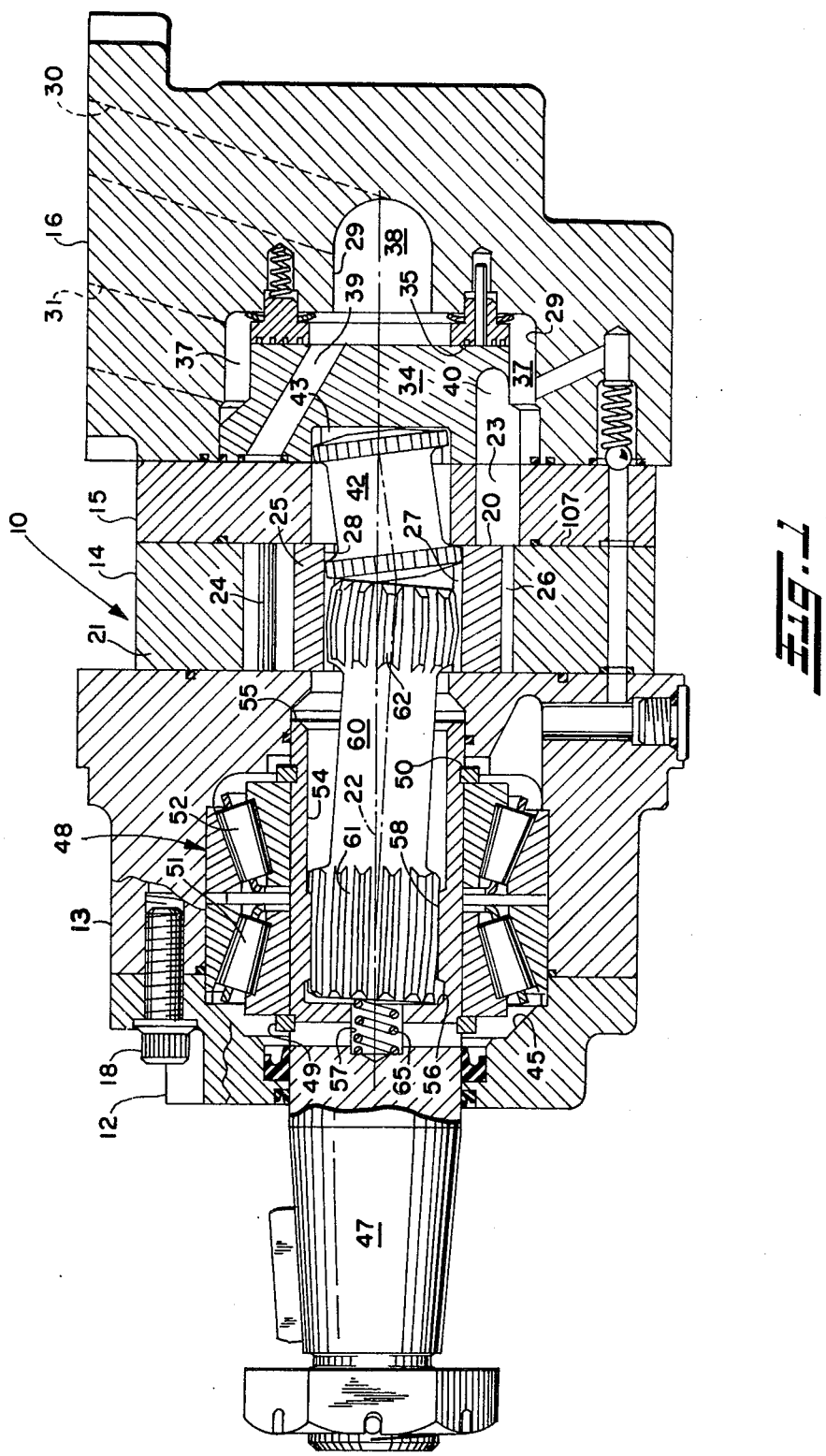
FIG. 1 is a longitudinally sectioned view of a rotary fluid device employing one embodiment of the axial drive positioning means of the subject invention.

The drawings illustrating the geometries of the angular drive connections are greatly exaggerated for ease of explanation and are not to scale.

Referring now to the drawings wherein the showings are for the purpose of illustrating a preferred embodiment of the invention only and not for the purpose of limiting same, FIG. 1 shows a fluid operated motor 10, it being understood that the term "motor" applied to such fluid operated devices also encompasses the use of such devices as "pumps". Motor 10 comprises several sections secured together which include, in their order from front to rear respectively, an end cap 12, a shaft support casing 13, a gear displacement unit or gerotor set 14, a port plate 15 and a valve casing 16. The basic construction and operation of such a motor 10 is known to those skilled in the art and will be better understood than will be explained herein by reference to U.S. Pat. No. 3,572,983 to H. McDermott.

The gerotor set 14 shown in FIG. 1 is known in the art and thus will not be described in detail herein. Briefly gerotor set 14 comprises an externally toothed star member 20 eccentrically disposed within an internally toothed ring member 21; the eccentricity $e$ of the gerotor set being shown in FIG. 3 as the distance between the ring member's centerline which coincides with the longitudinal centerline 22 of the device and the centerline 23 of the star member's axis. In the embodiment shown the ring member 21 has a plurality (N) of equally spaced rollers 24 defining ring teeth which interact with a plurality (N-1) of star teeth 25 to define a plurality (N) of volume chambers 26. The output member of the gerotor set shown is the star member and drive from star member 20 is achieved by a plurality of straight, involute type splines 27 disposed about a central opening 28 extending therethrough.

Disposed at one side of gerotor set 14 may be any known type of valving arrangement which sequentially ports fluid under desired pressure to selective volume chambers 26 while emptying other volume chambers to return to achieve a known motion from star member 20. More particularly star member 20 will partake of hypocycloidal movement with respect to ring member 21 whereby the centerline of the star member will orbit about the centerline of the ring member to define a circular path of radius $e$ in one given direction of rotational movement while rotating a peripheral distance equal to one star tooth in the opposite rotational direction. Such valving arrangements could comprise a known "disc valve" arrangement whereby a valving member driven at the orbiting speed of the star member produces desired porting or, alternatively, a "commutator-type valving" arrangement could be used whereby a valve member driven at the rotational speed of the star member achieves desired porting.

A commutator-type valving arrangement is illustrated in the embodiments disclosed and include port plate 15 abutting one end of gerotor set 14 and valve casing section 16 abutting the port plate. Within port plate 15 are a plurality (N) of port plate passages 23, each port plate passage 23 respectively aligned with a corresponding volume chamber 26. In valve casing section 16 is a central cavity 29 which communicates with interchangeable inlet and outlet ports 30,31 respectively. Disposed within central cavity 29 is a rotatable valve member 34 shown biased against port plate 15 by a plurality of known valve seats 35. When valve member 34 is disposed within central cavity 29 a first valve cavity 37 is defined to exist between the outer periphery of the valve member and the central cavity, and first valve cavity 37 is in fluid communication with outlet port 31. Similarly, a centrally disposed second valve cavity 38 exists at the rearward end of valve member 34, and a second valve cavity 38 is in fluid communication with the inlet port 30. Within valve member 34 is a first plurality (N-1) of circumferentially spaced interchangeable inlet valve passages 39 radially aligned with port plate passages 23 and in fluid communication with second valve cavity 38. Similarly a second plurality (N-1) of interchangeable outlet valve passages 40 circumferentially spaced between inlet valve passages 39 and radially aligned with port plate passages 23 are in fluid communication with first valve cavity 37. Rotation of valve member 34 to achieve desired porting occurs via a splined valve drive shaft 42 in splined engagement at one end with star member 20 and at its other end with valve member 34 by means of a centrally splined recess 43 formed therein.

Disposed at the opposite end of gerotor set 14 are end cap and shaft support casing sections 12,13 which together define a cylindrically stepped opening 45 extending therethrough. Extending within cylindrically stepped opening 45 is an input-output shaft 47 journalled within opening 45 by means of a tapered bearing arrangement 48. Input-output shaft 47 is fixed against axial movement by forward and rearward snap rings 49,50 within grooves formed in shaft 47 which respectively abut the inner races of forward and rearward bearings 51,52 of bearing arrangement 48.

A first bore 54 extends within shaft 47 from the shaft end 55 adjacent the gerotor set. First bore 54 in turn terminates at wall 56, and a second bore 57 in communication with first bore 54 extends further within shaft 47 and is concentric with the first bore. Within first bore 54 are a plurality of involute straight spline teeth 58. A drive connection between input-output shaft 47 and star member 20 is formed by a main universal drive shaft 60 having external, crowned spline teeth of involute configuration 61,62 disposed about both its end portions which engage spline teeth 58 in input-output shaft 47 and spline teeth 27 in star member 20 respectively.

In FIG. 1 the drive spline positioning means of the subject invention includes a spring 65 disposed within second bore 57, the function of which will be explained hereafter.

In FIG. 2 a second embodiment of the drive spline positioning means of the subject invention is shown in a motor 10' similar to the motor shown in the FIG. 1 and like numbers designated by a prime (') will indicate like parts where applicable. Drive positioning means shown in FIG. 2 include a centrally located first bore 67 extending through valve member 34 and in fluid communication at one end with second valve cavity 38' and at its other end with centrally splined recess 43'. Disposed in sliding sealing engagement within first bore 67 is a first plunger 68 having a forward end 69 adapted to contact valve drive shaft 42' and a rearward end 70 disposed within second valve cavity 38'. Formed in valve casing 16 is a second bore 72 axially aligned in a general manner with the first bore 67. Second bore 72 communicates at its forward end with second valve cavity 38' and communicates at its rearward end with a passageway 73 which in turn is in fluid communication with first valve cavity 37'. Disposed within second bore 72 and in sliding sealing engagement therewith is a second plunger 74 which has a forward end 75 adapted to contact the rearward end 70 of the first plunger 68 and a rearward end 76 which is adapted to be in fluid communication with passageway 73. It is contemplated that the sliding sealing engagement between first and second plungers 68,74 within their respective bores 67,72 is achieved by fit tolerances therebetween although O-rings disposed in grooves in either plungers or bores may be used to achieve the sliding, sealing fit desired.

OPERATION

As indicated previously, spline teeth 27,58 in star member 20 and input-output shaft 47 are straight and of the involute type having major, minor and pitch diameters respectively. The teeth of main drive shaft 60 are likewise involute but are crowned on the tooth flanks in the cylindrical plane defined by the pitch diameter from the apex 80 or center of each tooth end portion 61,62. More particularly the spline teeth taper frustoconically from each apex 80 at angles designated "A" in FIG. 4, into inner 61A,62A and outer 61B,62B angled tooth portions for each tooth portion 61,62 respectively (FIG. 3). It must be understood that tooth flank crowning angle in the cylindrical plane defined by the pitch diameter is a function of angle "A" but substantially smaller than angle "A".

When star member 20 moves, its centerline 23 will non-drivingly orbit about ring member's centerline 22 (defined as coplanar with input-output shaft's centerline and the centerline of device) to define a circle of radius $e$. Thus as shown in FIG. 3, the centerline 81 of main drive shaft 60 forms a drive angle "B" with centerline 22 of the input-output shaft which is equal to the drive angle between main drive shaft's centerline 81 and star member's centerline 23, also defined as angle "B". Drive angle "B" is determined as a function of main drive shaft length and of the eccentricity $e$ of the device and importantly remains constant in any orbit position of the star member.

When the star member is in its uppermost position with respect to the centerline of the device as shown in FIG. 4, it is desired that the major diameter (M.D.) of the top outer frusto-conical portion 62B and 62A of top and bottom teeth of main drive shaft 81 be parallel with star member's spline teeth's major diameter to insure adequate tooth contact when the proper spline tooth wear pattern is formed. Likewise when star member 20 is disposed at its bottommost position shown in FIG. 3, it is desired that top inner frusto-conical portion 62A and bottom outer frusto-conical portion 62B of the top and bottom drive shaft teeth be similarly aligned with the star member's spline teeth. Thus angle "A" is shown equal to angle "B". The pitch line, 108 in FIG. 4 is defined essentially as the contour of two conical planes extending to right and left of apex 80 and intersecting tooth flank points with equal spline tooth spacing along the spline tooth length, and at apex 80 intersecting tooth flank points with a tooth-spacing corresponding to the pitch diameter. To prevent end loading of the spline teeth the angle "C" is made slightly larger, about 30' larger, than the angle "B" or angle "A".

FIGS. 3 and 4 indicate only the top and bottom relative spline tooth positions. The positions of the remaining spline teeth for top and bottom positions of the star member will be determined by the position of a line Y—Y (shown in FIG. 4 as extending through apex 80 perpendicular to shaft centerline 81) as it rotates through angle "B" to coincide with line 5—5 at spline teeth 90° removed from the teeth illustrated in FIG. 4 and then as the line Y—Y rotates through angle "B" into its bottommost spline contact position.

This is more clearly indicated in FIG. 5 taken through plane 5—5 of FIG. 4 which shows relative spline teeth positions in a new or non-worn condition. The crowned spline teeth in FIG. 5 are projected from circular plane Y—Y into plane 5—5 which thus appears as an elipse. By definition an elipse will contact a circle only at two points and thus only crowned teeth 101 and 102, which are spaced 90° from upper crowned tooth 103 and positioned at the intersection of plane Y—Y with plane 5—5, are initially loaded in a line contact as shown. Upper spline tooth 103 is thus spaced a distance "D" between its pitch circle and that of its mating internally splined tooth and a distance "E" between the flank of spline tooth 103 and the internal spline tooth flank. Distance "E" is a function of angles "B" and "F" which is shown in FIGS. 4 and 5 respectively. Successive crowned teeth leading to teeth 101, 102 have distances proportionately less, which distances are determined as a function of angle "B" and "F". Thus drive-train geometry as described above, necessarily results in an "interference condition" between non-worn spline teeth as described in FIG. 5.

Assuming that the axial positions of the internal and external spline teeth remain fixed, a good essentially spherical wear pattern will develop on the spline teeth. Clearance "E" will be reduced to zero on the driving direction with the result that all spline teeth will contact one another and share shaft loading proportionately. If the drive shaft position is not axially fixed, then it should be clear the clearance "E" will never reduce to zero with the result that a few worn spline teeth, at any given instance will always be subjected to the full torque load as a concentrated flank load and will prematurely fail.

The developed wear pattern is shown in FIGS. 6, 7 and 8. FIG. 6 shows the flank wear pattern 105 developed on an internally splined tooth, it being clear that the wear of the externally splined teeth will be the mirror image of the internal tooth wear pattern. The flank pattern shown in FIG. 6 may be divided into area "X" on one side of line 7—7 and represents the outermost tooth contact area of the mating crowned spline tooth 62B which may occur for example in the spline position of spline tooth 102 in the star member as shown in FIG. 5. A similar pattern indicated as area "Y" exists on the other side of line 7—7, and this wear pattern may result from the inner crowned spline tooth area 62A and may occur for example in the spline position of spline tooth 101 in the star member as shown in FIG. 5. FIG. 7 which is a section view of the wear pattern taken along line 7—7 of FIG. 6 and FIG. 8 which is a sectional view of the wear pattern taken along line 8—8 of FIG. 7 show that the greatest wear occurs at the center 106 of the spline tooth flank along a line which is coplanar with line 5—5 and that the depth of the wear decreases along a spherical taper from the center point 106 (FIG. 8).

Tests have indicated that the above wear patterns will alleviate spline connection failures if the main drive shaft remains axially fixed with respect to the internally toothed splines. Tests have also indicated that the wear pattern developed is directly related to the magnitude of angle "B" which is established as 2°–3° in the embodiment shown, and that the tendency of the main shaft to shift relative to the star and input-output shaft is dependent upon the torque placed on the input-output shaft along with the magnitude of angle "B".

For explanation purposes it will be assumed angle "A" is fixed at 2°–3°, and the motor 10 of the subject invention is used to drive a wheel of an off-highway vehicle. When the wheel is driven, the hydraulic device will function as a motor; the drive resistance will cause the gerotor set to exert a torque on the input-output shaft and the spline teeth will lock into contact which tends to produce the above-described wear pattern. When the vehicle operator releases his foot from the accelerator the vehicle will undergo dynamic braking. That is, the wheel will tend to drive the motor as a pump and the braking torque applied to the input-output shaft will be reversed in direction from that applied to the input-output shaft when the device functions as a motor. The braking torque axially shifts the main drive shaft from its initial worn-in position resulting in a highly concentrated loading on a few spline teeth. When motor torque is again applied the original established tooth wear pattern is destroyed and a new proper wear pattern will not develop as long as the axial drive shifting takes place. Importantly, if there be a continuous motor-pump loading of the drive connection, then the proper seating wear pattern described above will not develop. Thus a few splines which may now be fatigued will always be subjected to concentrated loads and premature failures will occur.

Tests have correlated the torque exerted on input-output shaft 47 with an axial force tending to shift the main drive shaft 60 when the torque is released and reversed to the same extent (dynamic braking). For example with angle "B" at 2°—45 min., a motor torque of 1,000 lb.—in. which is reversed to a pump torque of 1,000 lb.—in. will exert an axial shifting force of 75 lbs. on main drive shaft 60 which thus tends to move shaft 60 relative input-output shaft 47 and star member 20. A maximum, rated motor torque of 7,000 lb.—in. will result, upon torque reversal, in an axial shift force of approximately 183 lbs. on main drive shaft 60.

Based on the above criteria, spring 65, shown in FIG. 1, is designed to exert a minimum precompressed or assembled load of 200 lbs. on main drive shaft 60. While spring 65 is shown as a helical compression spring, it should be apparent that other known springs including resilient blocks of oil-resistant, rubber-like material may be substituted therefor. Spring 65 thus biases main drive shaft 60 into contact with valve drive shaft 42 which in turn will abut the end of splines on port plate surface 107. To provide a good seating contact between the ends of the main drive shaft and the valve drive shaft, the ends of the main drive shaft taper in a frusto-conical manner from the center of the shaft at an angle slightly larger than angle "B" and the valve drive shaft angle is similarly sized dependent upon that member's drive angle.

In the second embodiment of the invention shown in FIG. 2, the fluid inlet pressure of the device provides the biasing means. Assuming port 31' to be connected with fluid under high pressure to produce rotation of star member 20' in a first given direction, high pressure will be communicated from the port 31' to the first valve cavity 37' and from there to passageway 73. Pressure in passageway 73 will then act on rearward end 76 of second plunger 74 to bias the second plunger into contact with rearward end 70 of first plunger 68. First plunger 68 is then biased forwardly into contact with valve drive shaft 42' which in turn forces a frusto-conical end of main drive shaft 60' into seating contact with end wall 56' of input-output shaft 47'. When port 30' is connected with high pressure to produce an opposite rotation of the star member, high pressure is communicated into second valve cavity 38'. Because passageway 73 is at low or return pressure, high pressure within the second valve cavity acts against the forward end 75 of the second plunger 74 and biases the second plunger rearwardly within its second bore 72. Simultaneously high pressure in the second valve cavity acting against rearward end 70 of first plunger 68 biases plunger 68 into contact with valve drive shaft 42' which in turn forces main drive shaft 60' into contact with first bore wall 56' in input-output shaft 47'. To achieve sufficient hydraulic biasing force, the plunger diameters are sized to afford a sufficient area to produce the highest maximum biasing force at the lowest rated inlet pressure of the motor. In the embodiment disclosed, i.e. a drive angle "B" of 2°—45 feet with a maximum rated force of 200 lbs. the plungers have a diameter of 0.350 inch. Also plunger ends 70–75 may be flared to prevent galling therebetween when plunger 68 rotates relative to plunger 74.

The hydraulic positioning arrangement shown in FIG. 2 is believed to illustrate an arrangement that can be easily incorporated at minimum expense into the design of existing motors. Thus a single plunger could replace both plungers 68, 74 shown. Such arrangement would require a second passage also leading to the rear of the single plunger and check valves would have to be employed in both passages. Additionally bores 67, 72 would have to be accurately machined in alignment with one another whereas such machining is not critical in the FIG. 2 embodiment. Similar reasons prevent the plunger arrangement from being economically incorporated in the shaft support casing section 13'. All such arrangements though are contemplated as falling within the scope of the present invention.

In summary it should be clear that the axial positioning means of the subject invention fixes the main drive shaft so that drive-train geometry can develop a "seating-in" wear pattern on the splines which permits all splines to equally share torque loads imposed on the drive-train.

The invention has been described with reference to a preferred embodiment. Obviously, modifications and alterations will occur to others, upon reading and understanding the specification. It is my intention to include all such modifications and alterations insofar as they come within the scope of the present invention.

It is thus the essence of the invention to provide positioning means for a drive-train similar to those incorporated in hydraulic devices of the gerotor type which improve the life expectancy of such drive-trains.

Having thus defined my invention, I claim:

1. Rotary apparatus comprising axial positioning means for spline teeth which operate as drive connection means between a rotating and orbiting main drive shaft and an externally toothed star member adapted to partake of hypocycloidal movement and between said main drive shaft and a rotatably fixed input-output shaft, said drive connection means including external, crowned spline teeth disposed about both end portions of said main drive shaft, one end portion of which is in splined drive relation with internal straight spline teeth in a central opening in said star member and the other end portion of which is in splined driving relation with internal straight spline teeth in a bore formed in said input-output shaft, said drive connection means subjected to varying bidirectional torque loading and said positioning means effective to develop a singular tooth wear pattern between internal and external spline teeth, said positioning means comprising:
   a. abutment means at one end of said main drive shaft preventing movement of said main drive shaft in a first axial direction;
   b. biasing means at the other end of said main drive shaft forcing said main drive shaft against said abutment means and preventing movement of said main drive shaft in an opposite axial direction, said biasing means maintaining said main drive shaft in a fixed axial position notwithstanding axial forces exerted on said main drive shaft by the magnitude and torque direction applied to said drive connection means;
   c. said biasing means including plunger means operable to bias said main drive shaft; and
   d. means providing fluid communication with said plunger means for biasing said plunger means into operation.

2. The rotary apparatus of claim 1 wherein
   said drive connection means and associated components comprise a rotary fluid device;
   said means providing fluid communication includes valving means for porting fluid to said rotary fluid device, said valving means including said device having a cavity in fluid communication with inlet and outlet ports therein, a valve member disposed in said cavity to define a first valve cavity in fluid communication with one of said ports and a second valve cavity in fluid communication with the other port;
   said means providing fluid communication further including said first valve cavity in fluid communication with said plunger means when said star member rotates in one direction; and
   said second valve cavity in fluid communication with said plunger means when said star member rotates opposite to said first mentioned direction.

3. The rotary apparatus of claim 2 wherein
   said plunger means includes a central opening extending through said valve member, a first plunger disposed in sliding, sealing engagement within said opening and extending therethrough, said first plunger operable by said fluid means to bias said main drive shaft at one end thereof and said first valve cavity in fluid communication with the opposite end of said first plunger.

4. The rotary apparatus as defined in claim 3 wherein
   said plunger means further includes said device having a bore therein and a first passage in fluid communication with said second valve cavity, said bore in fluid communication at one end with said first valve cavity and in fluid communication at its other end with said first passage; and
   a second plunger disposed in sliding sealing engagement within said bore and extending within said first fluid flow cavity for contact with said first plunger and common axial movement therewith.

5. A rotary fluid device comprising:

a. a gerotor set having an externally toothed star member eccentrically disposed within an internally toothed ring member to define a plurality of volume chambers by teeth interaction;

b. valving means for sequentially providing high and low pressure fluid communication to said volume chambers whereby said star member partakes of hypocycloidal movement with respect to said ring member;

c. drive connection means for transmitting torque from the rotation of said star member to an input-output shaft, said drive connection means including said input-output shaft having a first bore axially extending therein from an end thereof and straight spline teeth within a portion of said bore, said star member having a central opening therethrough with straight spline teeth disposed thereabout and a main drive shaft having crowned spline teeth disposed at its end portions in driving engagement with said straight spline teeth in said input-output shaft and said star member respectively;

d. axial positioning means for maintaining said main drive shaft in an axially fixed position with respect to said input-output shaft and said star member, said positioning means including abutment means for preventing axial movement of said main drive shaft in a first axial direction and biasing means for preventing movement of said shaft in a second axial direction opposite said first direction, said biasing means exerting a greater axial force on said main drive shaft than axial forces exerted on said main drive shaft by the torque developed in said gerotor set;

e. said biasing means includes plunger means operable to bias said main drive shaft and prevent movement of said main drive shaft in a second opposite axial direction; and f. means providing fluid communication with said plunger means for biasing said plunger means into operation.

6. The rotary fluid device of claim 5 wherein
said means providing fluid communication includes valving means for porting fluid to said gerotor set, said valving means includes said device having a cavity in fluid communication with inlet and outlet ports therein, a valve member disposed in said cavity to define a first valve cavity in fluid communication with one of said ports and a second valve cavity in fluid communication with the other port;
said means providing fluid communication further including said first valve cavity in fluid communication with said plunger means when said star member rotates in a given direction; and
said second valve cavity in fluid communication with said plunger means when said star member rotates opposite to said first mentioned direction.

7. The rotary fluid device of claim 6 wherein
said plunger means includes a central opening extending through said valve member, a first plunger disposed in sliding, sealing engagement with said opening and extending therethrough, said first plunger operable by said fluid communication means to bias said main drive shaft at one end thereof and said first valve cavity in fluid communication with the other end of said first plunger.

8. The rotary fluid device as defined in claim 7 wherein
said means for providing fluid communication further includes said device having a bore therein and a first passage in fluid communication with said second valve cavity, said bore in fluid communication at one end with said first valve cavity and in fluid communication at its other end with said first passage means; and
said plunger means further including a second plunger disposed in sliding sealing engagement within said bore and extending within said first fluid flow cavity for contact with said first plunger and common axial movement therewith.

* * * * *